United States Patent
Keller et al.

(10) Patent No.: US 7,347,784 B2
(45) Date of Patent: Mar. 25, 2008

(54) DRIVESHAFT ASSEMBLY AND METHOD OF MANUFACTURING SAME

(75) Inventors: Thomas J. Keller, Bristol, VA (US); James A. Duggan, Temperance, MI (US)

(73) Assignee: Torque-Traction Technologies LLC, Maumee, OH (US)

( * ) Notice: Subject to any disclaimer, the term of this patent is extended or adjusted under 35 U.S.C. 154(b) by 212 days.

(21) Appl. No.: 11/231,294

(22) Filed: Sep. 20, 2005

(65) Prior Publication Data

US 2007/0066406 A1 Mar. 22, 2007

(51) Int. Cl.
*F16D 3/40* (2006.01)
(52) U.S. Cl. .................... 464/127; 73/468; 29/901
(58) Field of Classification Search ............. 464/127, 464/134, 180, 182, 902; 29/901, DIG. 2, 29/DIG. 38, DIG. 48; 73/66, 458, 468
See application file for complete search history.

(56) References Cited

U.S. PATENT DOCUMENTS

| 3,940,948 | A | 3/1976 | Schultenkamper |
| 4,952,195 | A | 8/1990 | Traylor |
| 5,234,378 | A | 8/1993 | Helgesen et al. |
| 5,767,403 | A | 6/1998 | Kopp et al. |
| 6,287,208 | B1 | 9/2001 | Faulkenberry et al. |
| 6,773,354 | B2 * | 8/2004 | Marriott et al. ............ 464/127 |

* cited by examiner

*Primary Examiner*—Greg Binda
(74) *Attorney, Agent, or Firm*—MacMillan, Sobanski & Todd, LLC

(57) ABSTRACT

A driveshaft assembly includes a yoke including a body portion, a pair of opposed yoke arms that extends generally in a first axial direction from the body portion, and a neck portion that extends generally in a second axial direction from the body portion. A driveshaft tube is secured to the neck portion of the yoke, such as by magnetic pulse welding. A ring is secured to the body portion of the yoke, such as by press fitting, and a balance weight is secured to the ring, such as by welding.

14 Claims, 3 Drawing Sheets

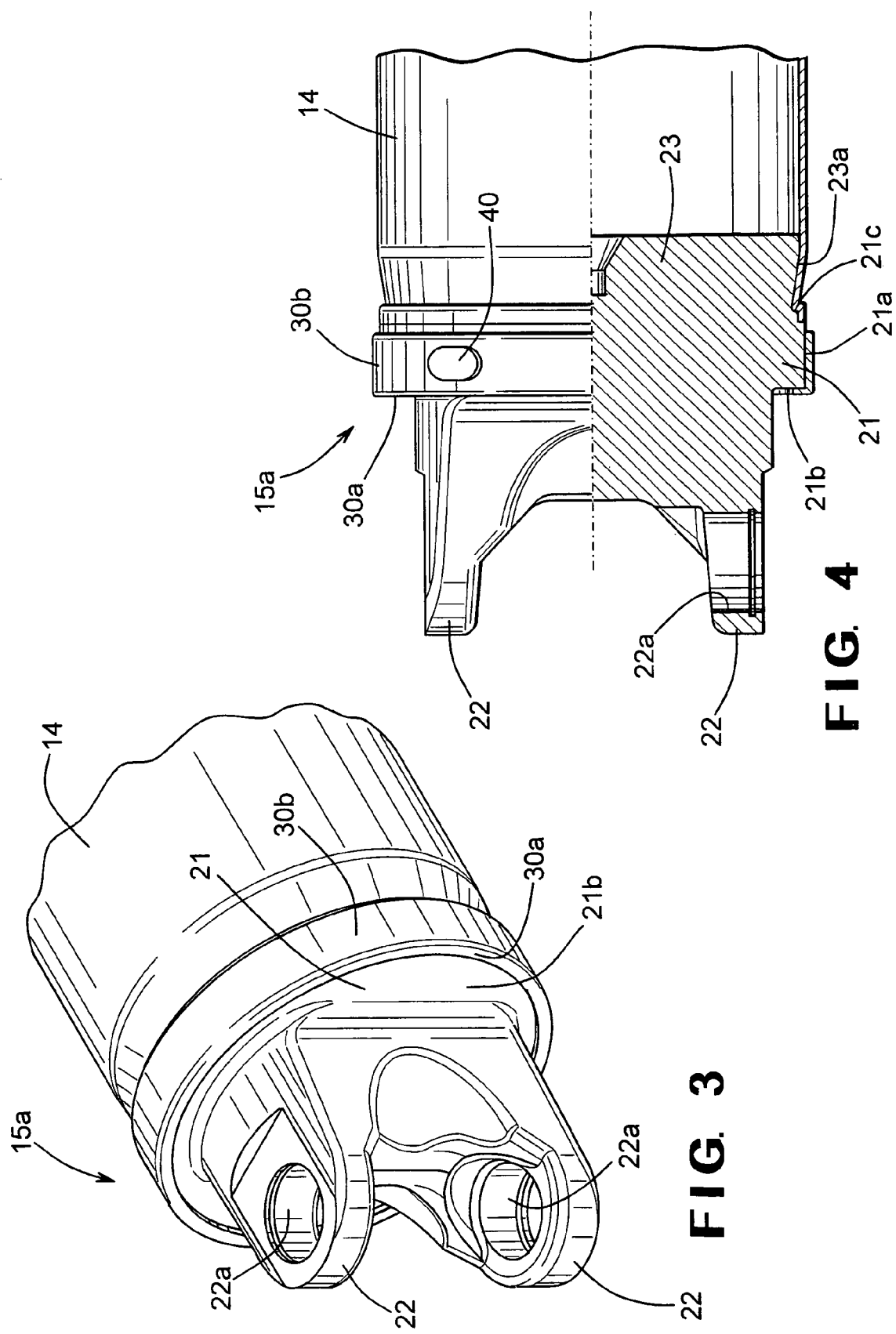

DRIVESHAFT ASSEMBLY AND METHOD OF MANUFACTURING SAME

BACKGROUND OF THE INVENTION

This invention relates in general to drive train systems for transferring rotational power from a source to a driven mechanism, such as from a vehicular engine/transmission assembly to an axle assembly. In particular, this invention relates to an improved structure for a driveshaft assembly for use in such a drive train system that is balanced for rotation during use, and to a method of manufacturing same.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Ideally, the driveshaft tube would be formed in the shape of a cylinder that is absolutely round, absolutely straight, and has an absolutely uniform wall thickness. Such a perfectly shaped driveshaft tube would be precisely balanced for rotation and, therefore, would not generate any undesirable noise or vibration during use. In actual practice, however, the driveshaft tube and other components of the driveshaft assembly usually contain variations in roundness, straightness, and wall thickness that result in minor imbalances when rotated at high speeds. To prevent such imbalances from generating undesirable noise or vibration when rotated during use, it is commonplace to counteract such imbalances by securing balance weights to selected portions of the driveshaft tube or other components of the driveshaft assembly. The balance weights are sized and positioned to counterbalance the imbalances of the driveshaft assembly such that it is balanced for rotation during use.

Traditionally, the balancing process has been performed with the use of a conventional balancing machine. A typical balancing machine includes a pair of fittings that are adapted to support the ends of the driveshaft assembly thereon. The balancing machine further includes a motor for rotating the driveshaft assembly at a predetermined speed. As the driveshaft assembly is rotated, the balancing machine senses vibrations that are caused by imbalances in the structure of the driveshaft assembly. The balancing machine is responsive to such vibrations for determining the size and location of one or more balance weights that, if secured to the driveshaft assembly, will minimize these imbalances. The rotation of the driveshaft assembly is then stopped to allow such balance weights to be secured to the outer surface of the driveshaft tube or other components of the driveshaft assembly in a conventional manner, such as by welding, adhesives, and the like. The driveshaft assembly is again rotated to confirm whether proper balance has been achieved or to determine if additional balance weights are required. A number of such balancing machines of this general structure and method of operation are known in the art.

In the past, vehicular driveshaft tubes have been formed from steel alloys or other metallic materials having relatively large wall thicknesses and having relatively high melting temperatures. In such driveshaft tubes, conventional welding processes have been commonly used to secure the balance weights directly thereto. Because of the relatively large wall thicknesses and relatively high melting temperatures of such driveshaft tubes, the heat generated during the welding process does not adversely distort the shape or affect the torque-transmitting capacity thereof in a significant manner. However, in some instances, it is desirable to form the driveshaft tubes having relatively small wall thicknesses or from materials having relatively low melting temperatures. For example, in racing vehicles, it may be desirable to minimize the wall thickness of the driveshaft tube to reduce weight. Also, it may be desirable to form the driveshaft tubes from aluminum alloys and other relatively lightweight metallic materials that have relatively low melting temperatures. The use of conventional welding processes to secure the balance weights directly to the driveshaft tubes in either of these instances is somewhat more difficult because the heat generated during the welding process may undesirably distort the shape or affect the torque-transmitting capacity thereof in a significant manner. Thus, it would be desirable to provide an improved structure for a driveshaft assembly for use in a drive train system that is balanced for rotation during use, and an improved method of manufacturing same, that avoids these problems.

SUMMARY OF THE INVENTION

This invention relates to an relates to an improved structure for an article, such as a driveshaft assembly for use in a drive train system, that is balanced for rotation during use, and to a method of manufacturing same. An annular sleeve is disposed about a portion of the article and is secured thereto, such as by welding, adhesives, frictional engagement, and the like. After the sleeve is secured to the article, one or more balance weights can be secured to the sleeve at desired locations to balance the article for rotation. The balance weights can be secured to the sleeve in any suitable manner, such as by welding, adhesives, and the like. The sleeve functions as a mounting surface upon which the balance weights can be secured to balance the article for rotation. Because the balance weights are secured not directly to the article, but rather are mounted indirectly thereon by the sleeve, the article is protected from damage that might otherwise result from welding the balance weights directly thereto.

Specifically, this invention relates to a structure for facilitating the welding of a balance weight to a lightweight rotatable tube, such as an aluminum driveshaft tube. A typical vehicular driveshaft assembly includes a hollow cylindrical driveshaft tube having a pair of tube yokes secured to the ends thereof. Traditionally, the vehicular driveshaft assembly has been balanced for rotation by securing one or more balance weights to the outer surfaces of the driveshaft tube or the tube yokes. When the driveshaft assembly is formed from an aluminum material, it has been found to be relatively difficult to weld the balance weight thereto. Adhesives have also been found to be undesirable. This invention contemplates that a hollow cylindrical sleeve be press fit about a portion of the driveshaft assembly, and that the balance weight be welded to the sleeve. Specifically, the sleeve (which is formed from a material that facilitates the welding process and does not react adversely to the adjacent aluminum material, such as steel) is press fit onto a portion of either or both of the tube yokes and the driveshaft tube so as to be fixed in position relative thereto. Then, one or more balance weights can be welded directly on the sleeve with relative ease. The sleeve is preferably press fit onto a relatively large diameter portion of the tube yoke adjacent to the universal joint so that (1) the balancing occurs relatively close to the rotational center of the universal joint and (2) relatively small balance weights can be used to achieve the desired balancing effect.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is an enlarged perspective view of the end of the driveshaft assembly illustrated in FIG. 2 shown assembled.

FIG. 4 is an enlarged side elevational view, partially in cross section, of the assembled end of the driveshaft assembly illustrated in FIG. 3.

DETAILED DESCRIPTION OF THE PREFERRED EMBODIMENT

Figure 1:
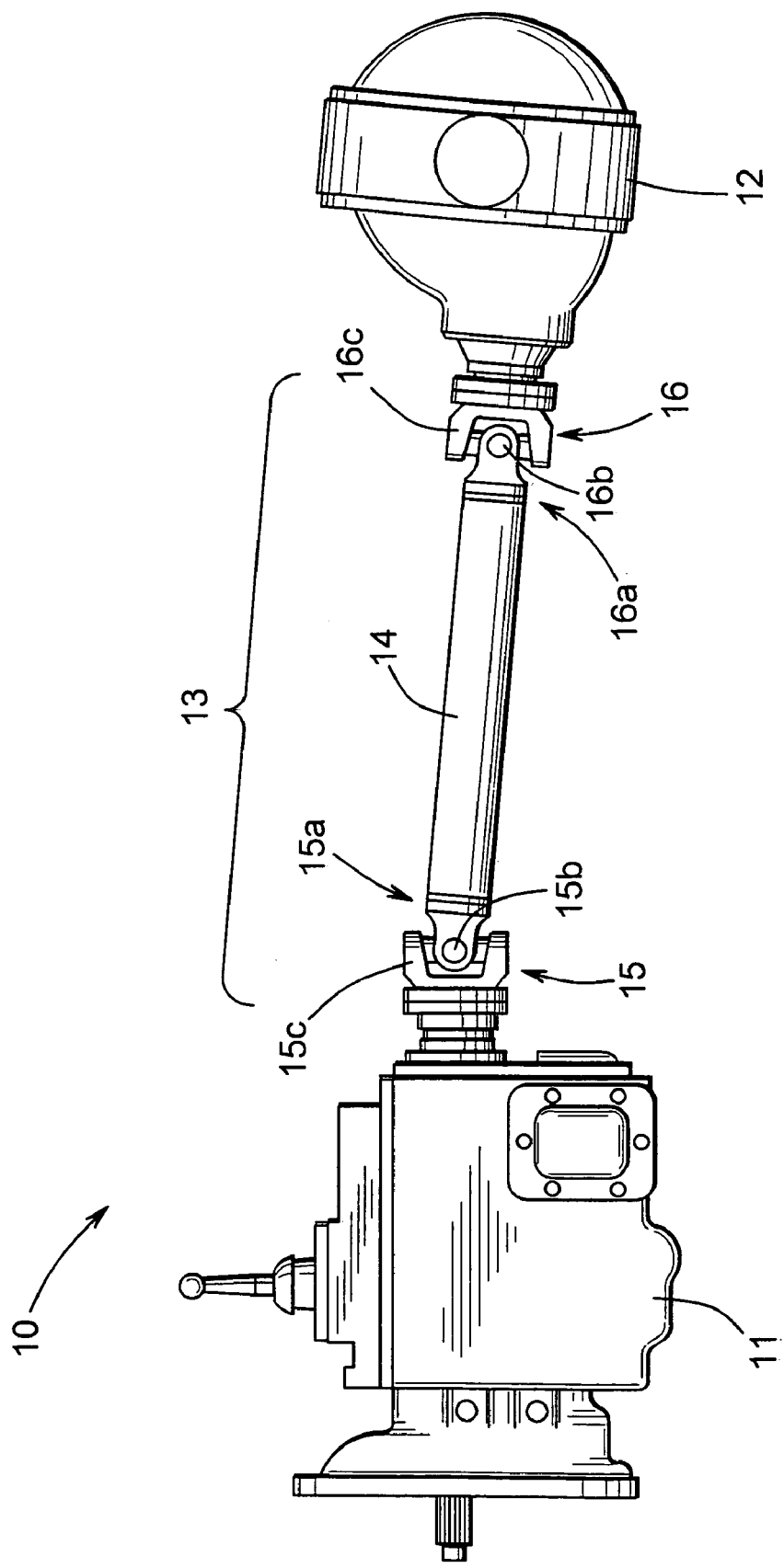
FIG. 1 is a side elevational view of a drive train system including a driveshaft assembly that is balanced for rotation in accordance with this invention.

Referring now to the drawings, there is illustrated in FIG. 1 a drive train system, indicated generally at 10, in accordance with this invention. The illustrated drive train system 10 is, in large measure, conventional in the art and is intended merely to illustrate one environment in which this invention may be used. Thus, the scope of this invention is not intended to be limited for use with the specific structure for the drive train system 10 illustrated in FIG. 1 or with drive train systems in general. On the contrary, as will become apparent below, this invention may be used in any desired environment for the purposes described below.

The illustrated drive train system 10 includes a transmission 11 having an output shaft (not shown) that is connected to an input shaft (not shown) of an axle assembly 12 through a driveshaft assembly 13. The transmission 11 is rotatably driven by an engine (not shown) that generates rotational power in a conventional manner. The driveshaft assembly 13 includes a cylindrical driveshaft tube 14 having a center portion and a pair of opposed end portions. The output shaft of the transmission 11 and the input shaft of the axle assembly 12 are typically not co-axially aligned. To accommodate this, a pair of universal joints, indicated generally at 15 and 16, are provided to respectively connect the end portions of the driveshaft tube 14 to the output shaft of the transmission 11 and to the input shaft of the axle assembly 12. The first and second universal joints 15 and 16 provide a rotational driving connection from the output shaft of the transmission 11 through the driveshaft tube 14 to the input shaft of the axle assembly 12, while accommodating a limited amount of angular misalignment between the rotational axes of these three shafts.

The first universal joint 15 includes a tube yoke assembly, indicated generally at 15a, that is secured to the forward end portion of the driveshaft tube 14 in the manner described below. The first universal joint 15 further includes a journal cross 15b that is connected to the tube yoke assembly 15a in a conventional manner. Lastly, the first universal joint 15 includes a flange yoke 15c that is connected between the output shaft of the transmission 11 and the cross 15b in a conventional manner. Similarly, the second universal joint 16 includes a tube yoke 16a that is secured to the rearward end portion of the driveshaft tube 14 in the manner described below. The second universal joint 16 further includes a journal cross 16b that is connected to the tube yoke 16a in a conventional manner. Lastly, the second universal joint 16 includes a flange yoke 16c that is connected between the cross 16b and the input shaft of the axle assembly 12 in a conventional manner. The structure of the flange yoke 16c and the manner of its securement to the driveshaft tube 14 can be identical to the flange yoke 15c, although such is not required.

Figure 2:
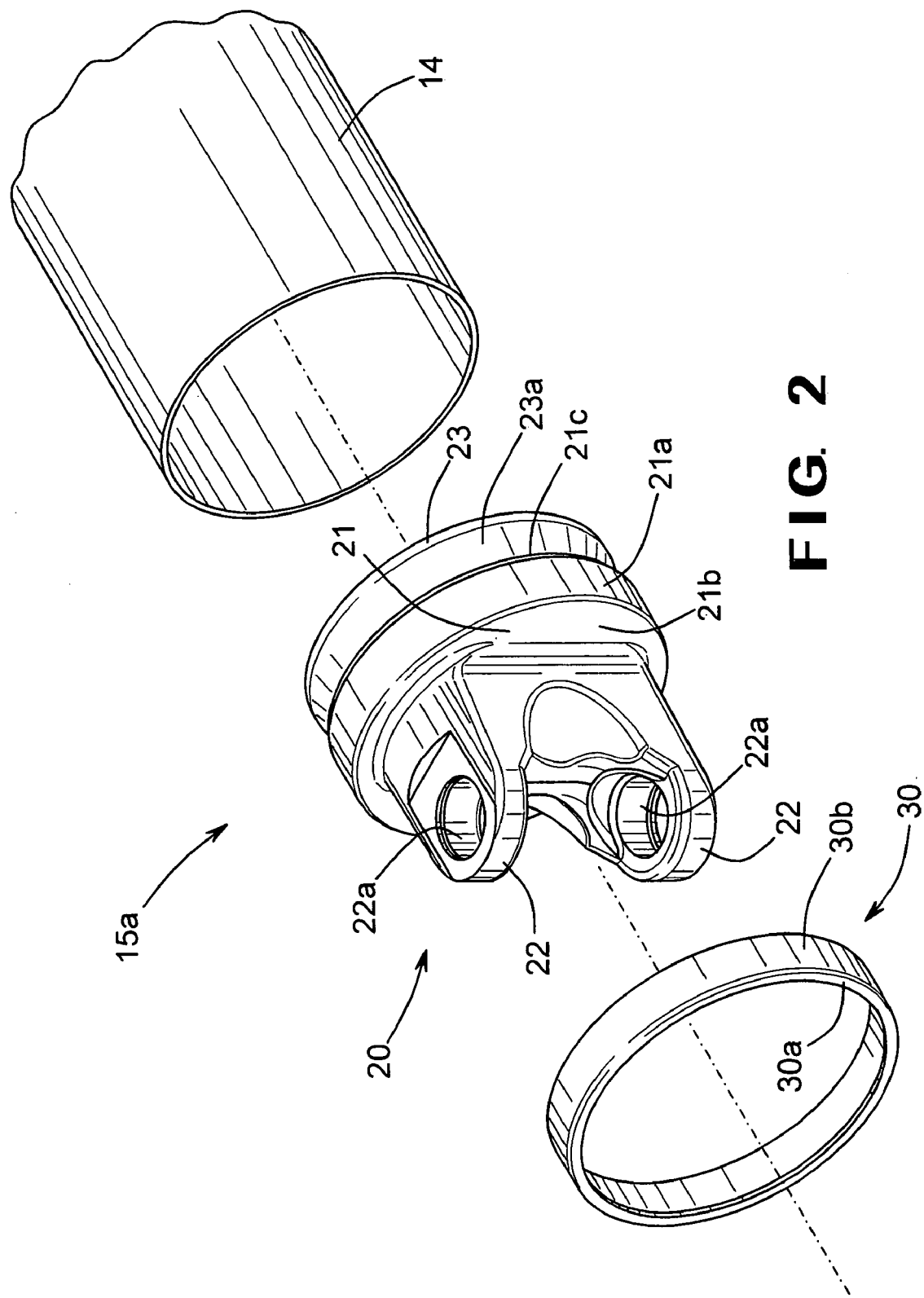
FIG. 2 is an enlarged exploded perspective view of one end of the driveshaft assembly illustrated in FIG. 1.

FIGS. 2, 3, and 4 illustrate the structure of the tube yoke assembly 15a in detail, as well as its method of manufacture. As shown therein, the tube yoke assembly 15a includes a tube yoke, indicated generally at 20, that is generally conventional in the art. The tube yoke 20 includes a body portion 21 having an outer cylindrical surface 21a. A pair of opposed yoke arms 22 extend generally in a first axial direction from the body portion 21. A pair of aligned openings 22a are formed through the yoke arms 22 and are adapted to receive respective portions of the universal joint cross 15b therein, in a manner that is well known in the art. Thus, the illustrated tube yoke 20 is a full round end yoke. However, it will be appreciated that the tube yoke 20 may be embodied as a half round end yoke or any other yoke structure. The body portion 21 of the tube yoke 20 defines a first annular shoulder 21b that faces in the first axial direction, although such is not required.

The tube yoke 20 further includes a neck portion 23 that extends generally in a second axial direction from the body portion 22 that is opposite to the first axial direction defined by the yoke arms 22. As best shown in FIG. 4, the neck portion 23 of the tube yoke 20 can include a frusto-conical outer surface 23a that tapers outwardly from a relatively small diameter to a relative large diameter as it extends in the second axial direction away from the body portion 21. However, the neck portion 23 of the tube yoke 20 can have any desired shape. At the junction between the body portion 21 and the neck portion 23 of the tube yoke 20, a second annular shoulder 21c is defined that faces in the second axial direction, although again such is not required.

The driveshaft tube 14 can be secured to the tube yoke 20 using any desired process. In the illustrated embodiment, the driveshaft tube 14 is secured to the tube yoke 20 by magnetic pulse welding. To accomplish this, the tube yoke 20 is initially co-axially aligned with the tube yoke 20, as shown in FIG. 2. Then, the driveshaft tube 14 is moved in the first axial direction such that the axial end thereof is received about and supported on the neck portion 23 of the tube yoke 20. Such axial movement continues until the leading end of the driveshaft tube 14 extends axially past the second shoulder 21c and about the body portion 21 of the tube yoke 20, as shown in FIGS. 3 and 4. Then, an inductor (not shown) of a magnetic pulse welding apparatus is disposed about the axially overlapping portions of the driveshaft tube 14 and the neck portion 23 of the tube yoke 20. The magnetic pulse welding apparatus is conventional in the art and is adapted to generate a relatively large electromagnetic field about the axially overlapping portions of the driveshaft tube 14 and the neck portion 23 of the tube yoke 20. When this occurs, a large pressure is exerted on the driveshaft tube 14, causing it to deform inwardly into engagement with the neck portion 23 of the tube yoke 20. As a result, the driveshaft tube 14 impacts the neck portion 23 of the tube yoke 20 at a relatively large velocity, thereby causing the driveshaft tube 14 to be permanently secured to the neck portion 23 of the tube yoke 20, as shown in FIGS. 3 and 4.

The tube yoke assembly 15*a* further includes a sleeve, indicated generally at 30, that is supported on the tube yoke 20. As best shown in FIG. 4, the illustrated sleeve 30 is generally L-shaped in cross section, including a radially extending portion 30*a* and an axially extending portion 30*b*. However, the sleeve 30 may have any desired shape. The illustrated sleeve 30 can be installed on the tube yoke 20 by initially aligning it co-axially with the tube yoke 20, as shown in FIG. 2. Then, the sleeve 30 is moved axially in the second direction over the yoke arms 22 such that the axially extending portion 30*b* thereof is received about and supported on the body portion 21 of the tube yoke 20. Such axial movement continues until the radially extending portion 30*a* of the sleeve 30 abuts the first shoulder 21*b* of the body portion 21 of the tube yoke 20, as shown in FIGS. 3 and 4. Preferably, the axially extending portion 30*b* of the sleeve 30 is received about and supported on the outer cylindrical surface 21*a* of the body portion 21 of the tube yoke 20 in a press fit relationship, although such is not required. Such a press fit relationship eliminates the need for further steps to retain the sleeve 30 on the tube yoke 20.

The driveshaft tube 14 and the tube yoke 20 can be formed from any desired material or materials. Preferably, however, the driveshaft tube 14 and the tube yoke 20 are formed from the same material. For example, the driveshaft tube 14 and the tube yoke 20 may be formed from an aluminum alloy material, such as 6061T-6 aluminum alloy material. The sleeve 30 can also be formed from any desired material or materials. Preferably, however, the sleeve 30 is formed from a material that facilitates the securement of one or more balancing weights thereto by a conventional welding process. Also, it is desirable that the sleeve 30 be formed from a material that does not react adversely to the material used to form the tube yoke 20. For example, the sleeve 30 may be formed from a steel alloy material.

The sleeve 30 facilitates the securement of one or more balance weights, such as shown at 40 in FIG. 4, to the tube yoke assembly 15*a*. This can be accomplished using a conventional rotational balancing machine (not shown). A typical balancing machine includes a pair of fittings that are adapted to support the ends of the driveshaft assembly 13 thereon. The balancing machine further includes a motor for rotating the driveshaft assembly 13 at a predetermined speed. As the driveshaft assembly 13 is rotated, the balancing machine senses vibrations that are caused by imbalances in the structure of the driveshaft assembly 13. The balancing machine is responsive to such vibrations for determining the size and location of one or more balance weights 40 that, if secured to the driveshaft assembly 13, will minimize these imbalances. The rotation of the driveshaft assembly 13 is then stopped to allow such balance weights 40 to be secured to the sleeve 30 in a conventional manner, such as by welding, adhesives, and the like. For example, the balance weights 40 can be secured to the sleeve 30 by projection welding. Projection welding is a resistance welding process between two or more surfaces or between the ends of one member and the surface of another. The welds are localized at predetermined points or projections (not shown) provided on the balance weights 30.

After the balance weights 40 have been secured to the sleeve 30, the driveshaft assembly 13 is again rotated to confirm whether proper balance has been achieved or to determine if additional balance weights 40 are required. A number of such balancing machines of this general structure and method of operation are known in the art.

The sleeve 30 is preferably press fit onto a relatively large diameter portion of the tube yoke 20 adjacent to the universal joint 15 so that (1) the balancing occurs relatively close to the rotational center of the universal joint 15 and (2) relatively small balance weights 40 can be used to achieve the desired balancing effect. The other illustrated tube yoke assembly 16*a* can be manufactured in the same manner as described above, although such is not required.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft assembly comprising:
   a yoke including a body portion having a radially extending portion and an axially extending portion, a pair of opposed yoke arms that extends generally in a first axial direction from said body portion, and a neck portion that extends generally in a second axial direction from said body portion;
   a driveshaft tube that is secured to said neck portion of said yoke;
   a ring that is secured to said body portion of said yoke, said ring including a radially extending portion that engages said radially extending portion of said body and an axially extending portion that engages said axially extending portion of said body; and
   a balance weight that is secured to said ring.

2. The driveshaft assembly defined in claim 1 wherein said yoke is a tube yoke having aligned openings formed through said pair of yoke arms.

3. The driveshaft assembly defined in claim 1 wherein said body portion of said yoke defines a shoulder, and wherein said ring includes a portion that engages said shoulder.

4. The driveshaft assembly defined in claim 1 wherein said yoke is formed from a first material and said ring is formed from a second material that is different from said first material.

5. The driveshaft assembly defined in claim 4 wherein said yoke is formed from an aluminum alloy material and said ring is formed from a steel alloy material.

6. The driveshaft assembly defined in claim 1 wherein said ring is secured to said body portion of said yoke in a press fit relationship.

7. The driveshaft assembly defined in claim 1 wherein said balance weight is secured to said ring by welding.

8. A method for manufacturing a driveshaft assembly comprising the steps of:
   (a) providing a yoke including a body portion having a radially extending portion and an axially extending portion, a pair of opposed yoke arms that extends generally in a first axial direction from the body portion, and a neck portion that extends generally in a second axial direction from the body portion;

(b) securing a driveshaft tube to the neck portion of the yoke;
(c) securing a ring to the body portion of the yoke, the ring including a radially extending portion that engages the radially extending portion of the body and an axially extending portion that engages the axially extending portion of the body; and
(d) securing a balance weight to the ring.

9. The method defined in claim 8 wherein said step (a) includes providing a tube yoke having aligned openings formed through the pair of yoke arms.

10. The method defined in claim 8 wherein said step (a) includes providing the body portion of the yoke with a shoulder, and wherein said step (c) includes engaging a portion of the ring with the shoulder.

11. The method defined in claim 8 wherein said step (a) includes providing the yoke from a first material, and wherein said step (c) includes providing the ring from a second material that is different from the first material.

12. The method defined in claim 8 wherein said step (a) includes providing the yoke from an aluminum alloy material, and wherein said step (c) includes providing the ring from a steel alloy material.

13. The method defined in claim 8 wherein said step (c) includes securing the ring to the body portion of the yoke in a press fit relationship.

14. The method defined in claim 8 wherein said step (d) includes securing the balance weight to the ring by welding.

\* \* \* \* \*